(12) United States Patent
Ohsugi (10) Patent No.: US 8,912,742 B2
(45) Date of Patent: Dec. 16, 2014

(54) CONTROL DEVICE FOR ROTATING ELECTRIC MACHINE AND METHOD OF CONTROLLING ROTATING ELECTRIC MACHINE

(75) Inventor: Ryosuke Ohsugi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 173 days.

(21) Appl. No.: 13/574,133

(22) PCT Filed: Feb. 3, 2010

(86) PCT No.: PCT/JP2010/051476
§ 371 (c)(1),
(2), (4) Date: Jul. 19, 2012

(87) PCT Pub. No.: WO2011/096051
PCT Pub. Date: Aug. 11, 2011

(65) Prior Publication Data
US 2012/0286716 A1 Nov. 15, 2012

(51) Int. Cl.
*H02P 6/00* (2006.01)
*H02P 27/08* (2006.01)

(52) U.S. Cl.
CPC ...................................... *H02P 27/08* (2013.01)
USPC ........................ 318/400.24; 318/811; 318/606

(58) Field of Classification Search
USPC .......... 318/400.23, 400.24, 400.25, 811, 606, 318/599
See application file for complete search history.

(56) References Cited

U.S. PATENT DOCUMENTS

| 7,567,048 B2 * | 7/2009 | Shin et al. ................ 318/400.24 |
| 7,821,440 B2 * | 10/2010 | Khoury ......................... 341/152 |
| 8,350,635 B2 * | 1/2013 | Pfaffinger et al. ............ 332/109 |
| 8,439,126 B2 * | 5/2013 | Bosch ............................... 173/2 |
| 2002/0190789 A1 * | 12/2002 | Morita ............................ 330/10 |
| 2005/0156665 A1 * | 7/2005 | Maejima ........................ 330/251 |
| 2012/0096881 A1 * | 4/2012 | Sakanobe et al. ............. 62/126 |

FOREIGN PATENT DOCUMENTS

| JP | A-5-184182 | 7/1993 |
| JP | 2006174645 A * | 6/2006 |
| JP | A-2006-174645 | 6/2006 |
| JP | A-2008-99475 | 4/2008 |
| JP | A-2009-89550 | 4/2009 |
| JP | A-2009-303288 | 12/2009 |

OTHER PUBLICATIONS

International Search Report issued in International Application No. PCT/JP2010/051476 on Apr. 27, 2010 (with translation).

* cited by examiner

*Primary Examiner* — Eduardo Colon Santana
*Assistant Examiner* — Bickey Dhakal
(74) *Attorney, Agent, or Firm* — Oliff PLC (57) ABSTRACT

An ECU executes a program including a step of detecting the rotation speed of a motor, a step of determining the diffusion width of carrier frequency, a step of determining the carrier frequency based on the determined diffusion width, a step of generating a carrier signal based on the determined carrier frequency, and a step of executing pulse width modulation based on an AC voltage command and the carrier signal.

7 Claims, 6 Drawing Sheets

CONTROL DEVICE FOR ROTATING ELECTRIC MACHINE AND METHOD OF CONTROLLING ROTATING ELECTRIC MACHINE

TECHNICAL FIELD

The present invention relates to PWM control of a rotating electric machine having a three-phase coil, and more particularly relates to a technique for determining a diffusion width of carrier frequency in accordance with the rotation speed of the rotating electric machine and changing the carrier frequency within a range of determined diffusion width to avoid occurrence of noise.

BACKGROUND ART

Conventionally, a power converter in which a PWM (Pulse Width Modulation) modulation method is used is well-known as a power converter used for driving a rotating electric machine having a three-phase coil. In such a power converter, harmonic noise resulting from on/off of switching elements may occur. Therefore, a technique for diffusing energy of harmonic noise in a broad frequency band by diffusing the carrier frequency to reduce the peak level of harmonic noise is publicly known.

As such a technique, Japanese Patent Laying-Open No. 2009-089550 (PTL 1), for example, discloses a power converter and a power conversion method that can further uniformize harmonic noise of carrier frequency. This power converter includes command value output means for outputting a command value, carrier wave power output means for outputting a carrier wave, carrier frequency changing means for changing the frequency of carrier wave, control signal generation means for comparing the command value and the carrier wave to generate a control signal based on the comparison result, and output means for outputting an output value based on the control signal. The carrier frequency changing means is characterized in that, as one value among a plurality of frequency values increases, the difference between the one value and a value adjacent to the one value in the case of arranging the plurality of values in an ascending order or descending order decreases.

According to the power converter disclosed in the above publication, harmonic noise of carrier frequency can be uniformized further.

CITATION LIST

Patent Literature

PTL 1: Japanese Patent Laying-Open No. 2009-089550

SUMMARY OF INVENTION

Technical Problem

In the case of diffusing the carrier frequency to uniformize harmonic noise, uniformization can be achieved as the diffusion width of carrier frequency increases, and harmonic noise can be reduced. However, in the case of increasing the diffusion width of carrier frequency, a problem arises in that a plurality of sideband wave components occurring around the carrier frequency while rotating electric machine is driven overlap one another, causing uncomfortable beat sound to occur.

In the above publication, such a problem is not taken into consideration at all, and cannot be solved.

The present invention has an object to provide a control device for a rotating electric machine and a method of controlling the rotating electric machine that prevent a plurality of sideband wave components occurring around a carrier frequency while the rotating electric machine is driven from overlapping one another to prevent noise from occurring.

Solution to Problem

A control device for a rotating electric machine according to an aspect of the present invention is a control device for a rotating electric machine having a three-phase coil. This control device includes a detection unit for detecting a rotation speed of the rotating electric machine, a determination unit for determining a diffusion width of a carrier frequency based on the rotation speed of the rotating electric machine detected by the detection unit such that a plurality of sideband wave components occurring centered on the carrier frequency while the rotating electric machine is driven are not superimposed on one another, a carrier generation unit for changing the carrier frequency within a range of the diffusion width determined by the determination unit to generate a carrier signal, and a pulse width modulation unit for executing pulse width modulation based on a command voltage and the carrier signal to generate a pulse signal for driving the rotating electric machine.

Preferably, the determination unit determines the diffusion width such that the diffusion width when the rotation speed of the rotating electric machine is a first rotation speed is larger than the diffusion width when the rotation speed is a second rotation speed which is lower than the first rotation speed.

More preferably, the determination unit determines the diffusion width such that the diffusion width changes in proportion to the rotation speed of the rotating electric machine between the first rotation speed and the second rotation speed.

Still more preferably, the determination unit determines the diffusion width such that the diffusion width changes stepwise relative to the rotation speed of the rotating electric machine between the first rotation speed and the second rotation speed.

Still more preferably, the carrier generation unit changes the carrier frequency at random within the range of the diffusion width determined by the determination unit to generate the carrier signal.

Still more preferably, the carrier generation unit changes the carrier frequency along a sine wave within the range of the diffusion width determined by the determination unit to generate the carrier signal.

Still more preferably, the carrier generation unit changes the carrier frequency so as to change stepwise within the range of the diffusion width determined by the determination unit to generate the carrier signal.

A method of controlling a rotating electric machine according to another aspect of the present invention is a method of controlling a rotating electric machine having a three-phase coil. This controlling method includes the steps of detecting a rotation speed of the rotating electric machine, determining a diffusion width of a carrier frequency based on the rotation speed of the rotating electric machine such that a plurality of sideband wave components occurring centered on the carrier frequency while the rotating electric machine is driven are not superimposed on one another, changing the carrier frequency within a range of the diffusion width to generate a carrier signal, and executing pulse width modulation based on a command voltage and the carrier signal to generate a pulse signal for driving the rotating electric machine.

Advantageous Effects of Invention

According to the present invention, by determining the diffusion width in proportion to the rotation speed of the rotating electric machine, a plurality of sideband wave components occurring around a carrier frequency in the case of changing the carrier frequency within a range of diffusion width can be prevented from overlapping one another, so that beat sound can be prevented from occurring.

DESCRIPTION OF EMBODIMENTS

Hereinafter, an embodiment of the present invention will be described with reference to the drawings. In the following description, the same parts have the same reference characters allotted. They are named and function identically as well. Detailed description thereof will thus not be repeated.

Figure 1:
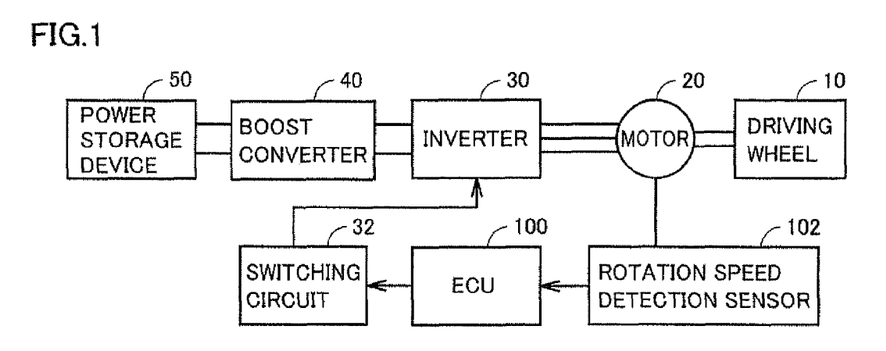
FIG. 1 is a schematic configuration diagram of a vehicle equipped with a control device for a rotating electric machine according to the present embodiment.

As shown in FIG. 1, a vehicle 1 includes a driving wheel 10, a motor 20, an inverter 30, a switching circuit 32, a boost converter 40, a power storage device 50, an ECU 100, and a rotation speed detection sensor 102. The control device for a rotating electric machine according to the present embodiment is implemented by ECU 100.

Motor 20 is a rotating electric machine having a three-phase coil for generating torque that drives driving wheel 10 of vehicle 1 which is an electric powered vehicle (which shall be a vehicle that generates a vehicle driving force by electrical energy, such as a hybrid vehicle, an electric vehicle and a fuel cell vehicle).

Moreover, motor 20 may be configured to have the function of a power generator driven by an engine, in addition to the function as a motor that generates a vehicle driving force. Further, motor 20 may be incorporated into a hybrid vehicle so as to operate as a motor for the engine and to be capable of starting the engine, for example.

In the present embodiment, motor 20 is a three-phase synchronous motor, and one end of each of three coils of U, V and W-phases is connected in common to a neutral point. Furthermore, the other end of each phase coil is connected to inverter 30.

Typically, power storage device 50 is a rechargeable DC electric power supply, such as a nickel-metal hydride, lithium ion or similar secondary battery, or an electric double layer capacitor.

Boost converter 40 performs an operation (hereinafter referred to as a switching operation) of turning on/off a switching element included in boost converter 40 by a switching circuit (not shown) operating based on a converter control signal from ECU 100 during driving control of motor 20 to boost a DC voltage from power storage device 50 for supply to inverter 30, and steps down a DC voltage from inverter 30 for supply to power storage device 50 during regenerative control of motor 20.

Inverter 30 performs a switching operation by switching circuit 32 during driving control of motor 20 to convert a DC power from boost converter 40 into AC power for supply to motor 20 during driving control of motor 20, and converts AC power from motor 20 into DC power for supply to boost converter 40 during regenerative control of motor 20. Switching circuit 32 performs a switching operation on a switching element included in inverter 30 based on an inverter control signal from ECU 100.

Rotation speed detection sensor 102 detects the rotation speed of motor 20. Rotation speed detection sensor 102 transmits a signal indicating the detected rotation speed of motor 20 to ECU 100.

Rotation speed detection sensor 102 may be implemented by a rotational angle sensor (resolver) detecting the rotor rotation angle (electrical angle) of motor 20, for example. ECU 100 may calculate the rotation speed of motor 20 based on the rotation angle received from the rotational angle sensor. Alternatively, rotation speed detection sensor 102 may be omitted by calculating the rotation speed in ECU 100 directly from a motor voltage or current.

ECU 100 operates motor 20 by software processing by executing, at a CPU (Central Processing Unit) not shown, a program previously stored in a memory 104 provided therein, and/or hardware processing by means of a dedicated electronic circuit.

As a typical function, ECU 100 controls the operations of boost converter 40 and inverter 30 such that motor 20 outputs torque in accordance with a torque command value based on the torque command value, the voltage and current at power storage device 50, the voltage output from boost converter 40 to inverter 30, the current at motor 20, the rotation speed of motor 20, and the like. That is, ECU 100 generates a converter control signal and an inverter control signal for controlling the operations of boost converter 40 and inverter 30, and transmits the signals to the switching circuit of boost converter 40 and switching circuit 32 of inverter 30, respectively.

Figure 2:
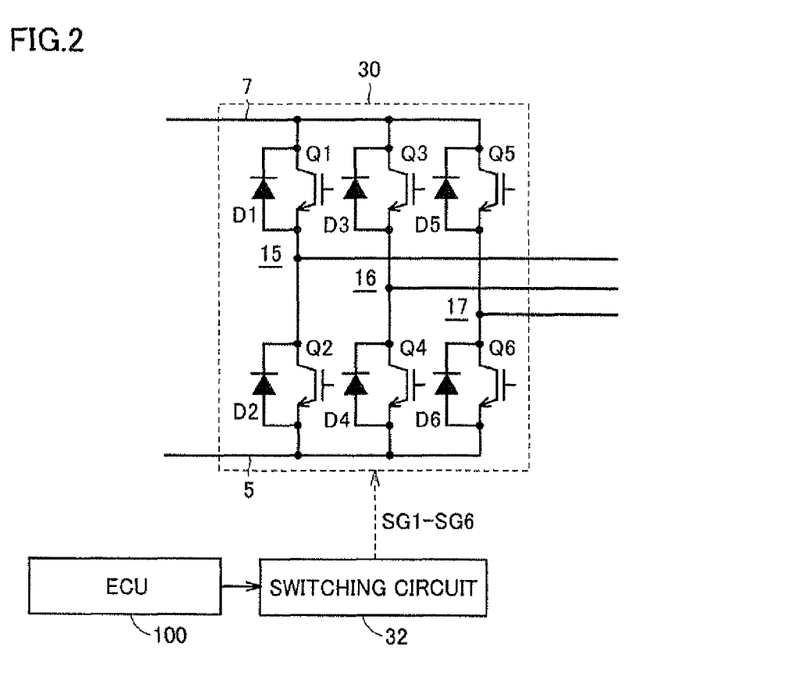
FIG. 2 is a diagram showing a configuration of an inverter in the present embodiment.

As shown in FIG. 2, inverter 30 includes a U-phase vertical arm 15, a V-phase vertical arm 16 and a W-phase vertical arm 17 provided in parallel to one another across a positive electrode bus 7 and a negative electrode bus 5.

The vertical arm of each phase includes switching elements connected in series across positive electrode bus 7 and negative electrode bus 5. For example, U-phase vertical arm 15 includes switching elements Q1 and Q2. V-phase vertical arm 16 includes switching elements Q3 and Q4. W-phase vertical arm 17 includes switching elements Q5 and Q6.

In addition, antiparallel diodes D1 to D6 are connected to switching elements Q1 to Q6, respectively. On/off of switching elements Q1 to Q6 is controlled by switching control signals SG1 to SG6 from switching circuit 32, respectively.

In the present embodiment, the switching elements used for inverter 30 and converter 40 can be implemented by IGBTs (Insulated Gate Bipolar Transistors), power MOS (Metal Oxide Semiconductor) transistors, or power bipolar transistors, for example.

When the torque command value for motor 20 is a positive value, inverter 30 converts a DC voltage from boost converter 40 into an AC voltage by the switching operation of switching elements Q1 to Q6 in response to switching control signals SG1 to SG6 from switching circuit 32, respectively, to drive motor 20 to output positive torque.

When the torque command value for motor 20 is zero, inverter 30 converts the DC voltage from boost converter 40 into an AC voltage by the switching operation in response to switching control signals SG1 to SG6 to drive motor 20 such that torque becomes zero.

Furthermore, during regenerative control of vehicle 1, the torque command value for motor 20 is set to be negative. In this case, inverter 30 converts an AC voltage generated by motor 20 into a DC voltage by the switching operation in response to switching control signals SG1 to SG6 to supply the converted DC voltage to boost converter 40. It is noted that the regenerative control as used herein includes control of motor 20 during braking accompanied by regenerative power generation when a driver driving the vehicle operates the foot brake, and control of motor 20 in the case of decelerating (or stopping acceleration of) the vehicle while achieving regenerative power generation by releasing the accelerator pedal during running although the foot brake is not operated, thereby charging power storage device 50.

ECU 100 executes PWM control so as to cause switching circuit 32 to generate switching control signals SG1 to SG6 for supply to inverter 30. Hereinafter, the operation in PWM control will be explained briefly. In PWM control, on/off of the switching elements of each phase of inverter 30 is controlled based on a voltage comparison between a carrier wave (carrier signal) and U-phase, V-phase and W-phase AC voltage commands based on torque command values. Accordingly, a pulse width modulation voltage as a pseudo sine wave voltage is applied to each phase of motor 20. The carrier signal can be formed by a triangular wave or a sawtooth wave, for example.

A current harmonic component produced at the time of such a switching operation is superimposed on a motor driving current, and an electromagnetic force varies, so that harmonic noise occurs.

Therefore, by changing the frequency of this carrier signal (hereinafter referred to as a carrier frequency) at random within a predetermined range of diffusion width indicated by the broken line of FIG. 3 centered on a reference frequency f(0), for example, energy of harmonic noise of carrier frequency can be diffused in a broad frequency band, which can reduce the peak level of harmonic noise. It is noted that the vertical axis of FIG. 3 indicates the rotation speed of motor 20, and the horizontal axis of FIG. 3 indicates the carrier frequency.

However, when diffusing the carrier frequency to attempt to uniformize harmonic noise, a plurality of sideband wave components of carrier frequency may be superimposed on one another due to increase in diffusion width of carrier frequency, so that uncomfortable beat sound may occur as noise.

Figure 3:
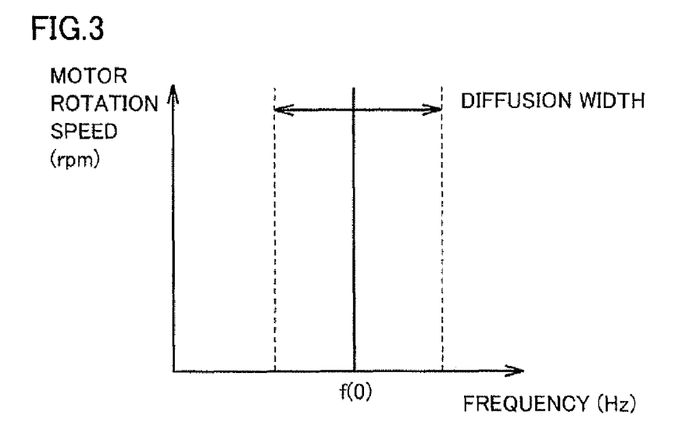
FIG. 3 is a diagram showing diffusion width of carrier frequency independent of motor rotation speed.
Figure 4:
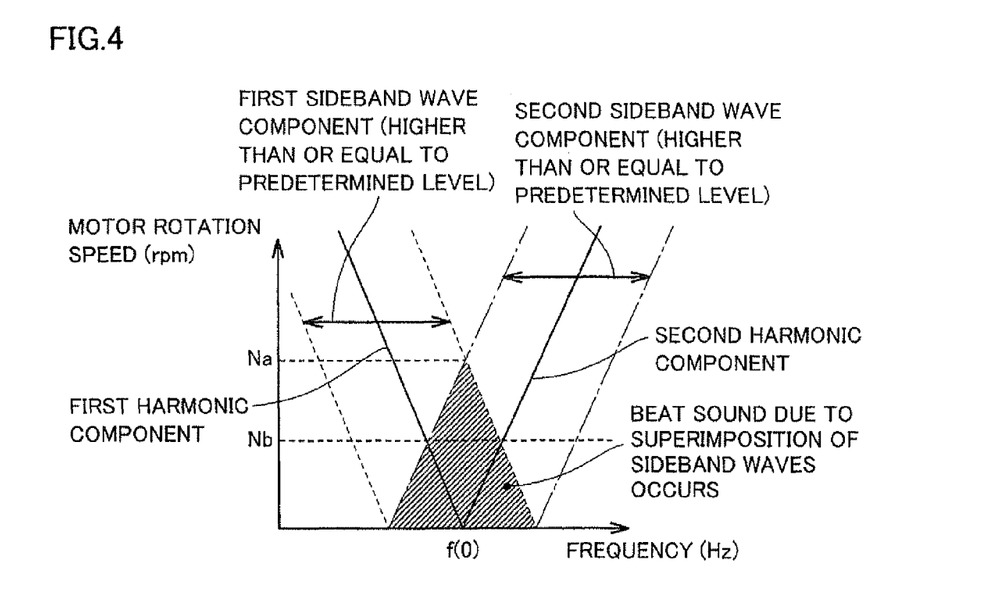
FIG. 4 is a diagram showing changes in sideband wave components assuming the diffusion width of carrier frequency to be constant.

For example, when changing the carrier frequency at random within the range of diffusion width shown in FIG. 3, two sideband wave components of carrier frequency may be superimposed on each other, as indicated by a hatched region of FIG. 4. The vertical axis of FIG. 4 indicates the rotation speed of motor 20, and the horizontal axis of FIG. 4 indicates the frequency.

As indicated by the solid line of FIG. 4, the current harmonic component has a first harmonic component whose peak level frequency decreases as the rotation speed of motor 20 increases, and a second harmonic component whose peak level frequency increases as the rotation speed of motor 20 increases.

As to a first sideband wave component of carrier frequency indicated by the broken line of FIG. 4, the frequency band of sideband wave component higher than or equal to a predetermined level decreases as the rotation speed of motor 20 increases along with changes in the first harmonic component.

As to a second sideband wave component of carrier frequency indicated by the alternate long and short dash line of FIG. 4, the frequency band of sideband wave component higher than or equal to the predetermined level increases as the rotation speed of motor 20 increases, similarly to the changes in the second harmonic component.

As a result, as indicated by the hatched region of FIG. 4, the first sideband wave component and the second sideband wave component are partly superimposed on each other when the rotation speed of motor 20 is smaller than Na. It is noted that the predetermined level refers to a level at which beat sound may occur when two sideband wave components are superimposed on each other.

Figure 5:
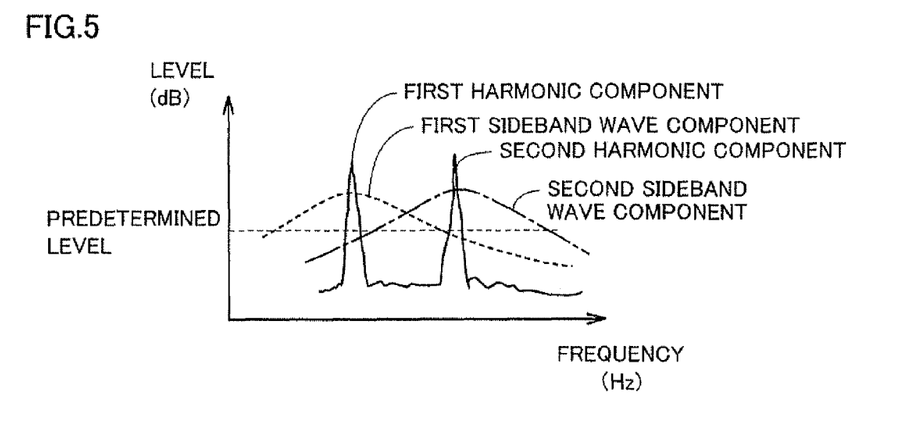
FIG. 5 is a diagram showing distributions of sideband wave components independent of motor rotation speed.

For example, FIG. 5 shows frequency distributions of the first sideband wave component and the second sideband wave component in the case where the rotation speed of motor 20 is Nb which is smaller than Na. The vertical axis of FIG. 5 indicates the level, and the horizontal axis of FIG. 5 indicates the frequency. As shown in FIG. 5, when changing the carrier frequency at random within the range of diffusion width of FIG. 3, beat sound will occur due to superimposition of the first sideband wave component indicated by the broken line of FIG. 5 and the second sideband wave component indicated by the alternate long and short dash line of FIG. 5.

Therefore, the present embodiment is characterized in that ECU 100 determines the diffusion width of carrier frequency based on the rotation speed of motor 20 detected by rotation speed detection sensor 102 such that the sideband wave components of carrier frequency will not be superimposed on each other, changes the carrier frequency within the range of determined diffusion width to generate a carrier signal, and executes pulse width modulation based on an AC voltage command and the carrier signal to generate a pulse signal for driving motor 20.

Moreover, ECU 100 determines the diffusion width such that the diffusion width in the case where the rotation speed of motor 20 is a first rotation speed is larger than the diffusion width in the case where the rotation speed is a second rotation speed which is smaller than the first rotation speed.

In the present embodiment, ECU 100 determines the diffusion width such that the diffusion width changes in proportion to the rotation speed between the first rotation speed and the second rotation speed. Furthermore, ECU 100 changes the carrier frequency at random within the range of determined diffusion width to generate the carrier signal.

Figure 6:
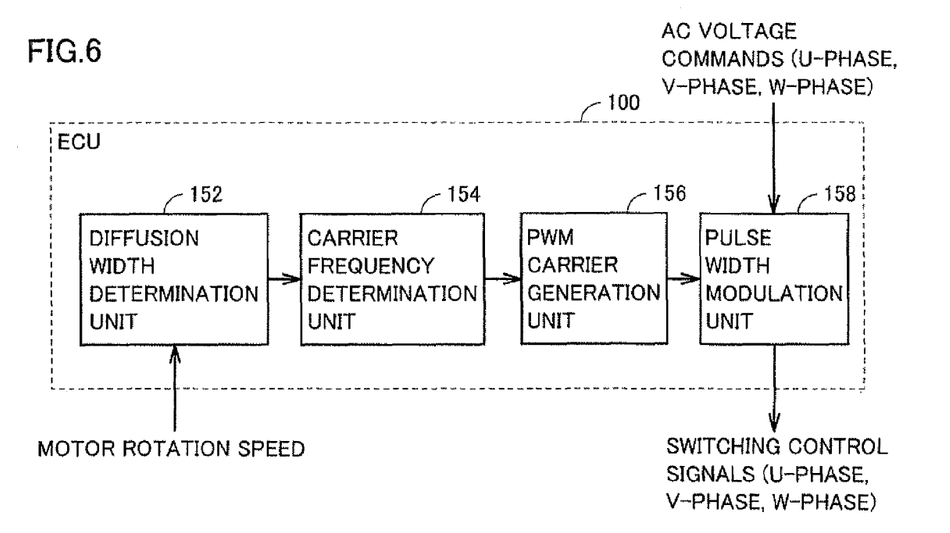
FIG. 6 is a functional block diagram of ECU as the control device for the rotating electric machine according to the present embodiment.

FIG. 6 shows a functional block diagram of ECU 100 as the control device for the rotating electric machine according to the present embodiment. ECU 100 includes a diffusion width determination unit 152, a carrier frequency determination unit 154, a PWM carrier generation unit 156, and a pulse width modulation unit 158.

Figure 7:
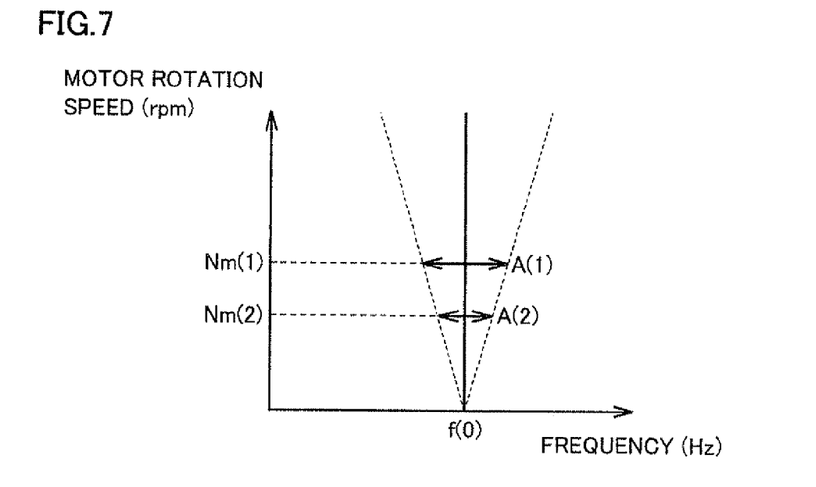
FIG. 7 is a map showing the relationship between motor rotation speed and diffusion width of carrier frequency.

Diffusion width determination unit 152 determines the diffusion width of carrier frequency in accordance with the rotation speed of motor 20. For example, the relationship between the rotation speed and the diffusion width shown in FIG. 7 is previously stored as a map. Diffusion width determination unit 152 determines the diffusion width based on the rotation speed of motor 20 and the map as stored. The horizontal axis of FIG. 7 indicates the carrier frequency, and the vertical axis of FIG. 7 indicates the rotation speed of motor 20.

As shown in FIG. 7, a diffusion width A(1) in the case where the rotation speed of motor 20 is Nm(1) is larger than a diffusion width A(2) in the case where the rotation speed of motor 20 is Nm(2) which is lower than Nm(1).

Further, diffusion width determination unit 152 determines the diffusion width so as to change in proportion to the rotation speed of motor 20 at least between Nm(1) and Nm(2). Preferably, it is desirable to determine the diffusion width so as to change in proportion to the rotation side of motor 20 until a predetermined rotation speed is attained after the start of driving of motor 20. This is because superimposition of a plurality of sideband wave components occurs in a lower speed range equal to or lower than the predetermined rotation speed.

Returning to FIG. 6 again, carrier frequency determination unit 154 changes the carrier frequency at random within the diffusion width determined by diffusion width determination unit 152 to determine a final carrier frequency.

Carrier frequency determination unit 154 calculates the upper and lower limit values of the range of carrier frequency to be changed at random, based on the determined diffusion width. In the present embodiment, carrier frequency determination unit 154 calculates the upper and lower limit values of the range of carrier frequency to be changed at random so as to be symmetrical with respect to reference frequency f(0).

Specifically, carrier frequency determination unit 154 calculates, as the upper limit value, a value obtained by adding a half value of the determined diffusion width to reference frequency f(0), and calculates, as the lower limit value, a value obtained by subtracting a half value of the determined diffusion width from reference frequency f(0).

It is noted that reference frequency f(0) may be a predetermined frequency, or may be a frequency determined depending on the state of vehicle.

Carrier frequency determination unit 154 changes the carrier frequency at random within the range of the calculated upper and lower limit values to determine the final carrier frequency. It is noted that, as a method of changing the carrier frequency at random, for example, a value calculated using a random function may be subjected to a filter or the like to output a value between the upper and lower limit values, or a function that outputs a value at random between the upper and lower limit values by specifying the upper and lower limit values may be used, or the carrier frequency may be changed at random using any other well-known method.

PWM carrier generation unit 156 generates a carrier signal based on the final carrier frequency determined by carrier frequency determination unit 154. PWM carrier generation unit 156 transmits the generated carrier signal to pulse width modulation unit 158.

Pulse width modulation unit 158 executes pulse width modulation based on the AC voltage command for each phase and the carrier signal received from PWM carrier generation unit 156 to generate a pulse signal for each phase for driving motor 20. Pulse width modulation unit 158 transmits the generated pulse signal to switching circuit 32.

Switching circuit 32, in response to the received pulse signal, generates switching control signals SG1 to SG6 for turning on/off the switching elements of vertical arms of the respective phases of inverter 30, and transmits the signals to inverter 30. Accordingly, a pseudo sine wave voltage equivalent to a pulse width modulation voltage is applied to each phase of motor 20.

The present embodiment has described that diffusion width determination unit 152, carrier frequency determination unit 154, PWM carrier generation unit 156, and pulse width modulation unit 158 shall each function as software implemented by CPU of ECU 100 executing a program stored in memory 104, but may be implemented by hardware. It is noted that such a program is recorded on a storage medium and is mounted on the vehicle.

Figure 8:
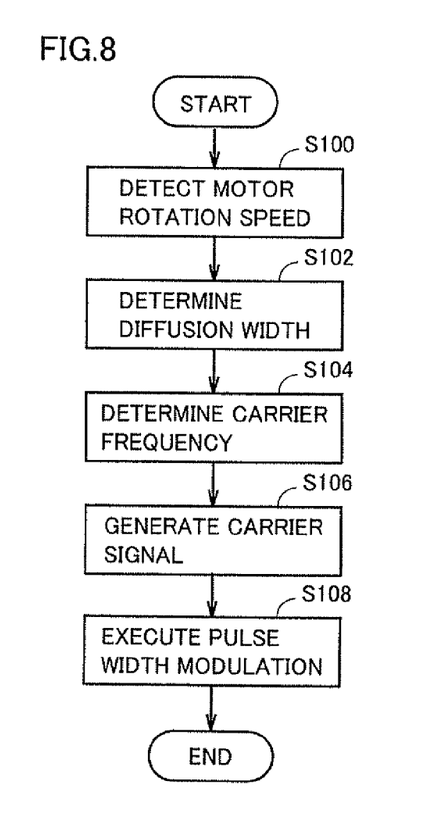
FIG. 8 is a flowchart showing a control structure of a program executed by ECU as the control device for the rotating electric machine according to the present embodiment.

The control structure of the program executed by ECU 100 as the control device for the rotating electric machine according to the present embodiment will now be explained with reference to FIG. 8.

In Step (step will hereinafter be denoted by S) 100, ECU 100 detects the rotation speed of motor 20. In S102, ECU 100 determines the diffusion width based on the detected rotation speed of motor 20 and the map shown in FIG. 7.

In S104, ECU 100 determines the final carrier frequency based on reference frequency f(0) and the determined diffusion width. Since the method of determining the carrier frequency is as described above, the detailed description thereof will not be repeated.

In S106, ECU 100 generates a carrier signal based on the determined final carrier frequency. In S108, ECU 100 executes pulse width modulation based on the AC voltage command for each phase and the carrier signal to generate a pulse signal, and transmits the generated pulse signal to switching circuit 32.

The operation of ECU 100 as the control device for the rotating electric machine according to the present embodiment based on the configuration and flowchart as described above will now be explained.

At the time of driving control of motor 20, ECU 100 determines the diffusion width in accordance with the detected rotation speed of motor 20 (S100, S102). ECU 100 changes the diffusion width so as to increase in proportion to the increase in rotation speed of motor 20 to determine the diffusion width.

ECU 100 determines the final carrier frequency changed at random within the range of determined diffusion width (S104). ECU 100 generates a carrier signal based on the determined final carrier frequency (S106). ECU 100 executes pulse width modulation based on the AC voltage command for each phase and the carrier signal to generate a pulse signal (S106).

Figure 9:
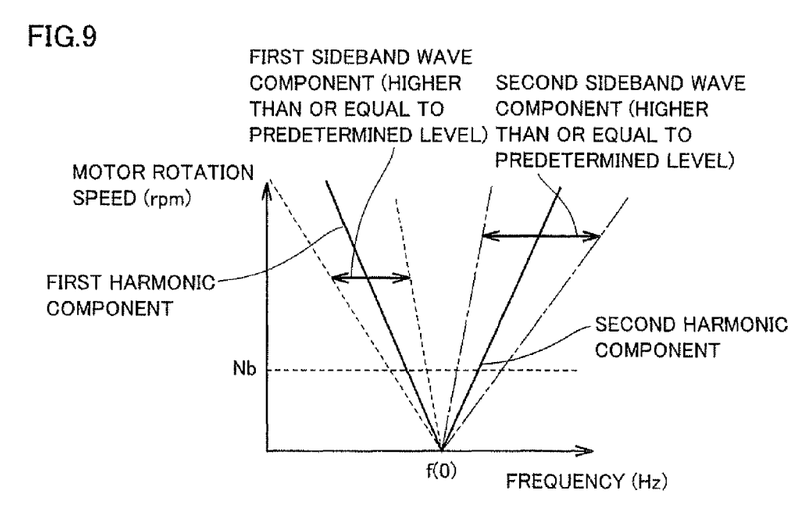
FIG. 9 is a diagram showing changes in sideband wave components in the case of determining diffusion width depending on motor rotation speed.

FIG. 9 shows changes in frequency band of sideband wave components higher than or equal to the predetermined level relative to the rotation speed of motor 20 in the case where the diffusion width of carrier frequency is determined based on the rotation speed of motor 20. The vertical axis of FIG. 9 indicates the rotation speed of motor 20, and the horizontal axis of FIG. 9 indicates the frequency.

In accordance with the map shown in FIG. 7, the diffusion width is determined to have a smaller value as the rotation speed of motor 20 decreases, and the diffusion width is determined to have a larger value as the rotation speed of motor 20 increases. Therefore, the frequency band of the first sideband wave component higher than or equal to the predetermined level of carrier frequency indicated by the broken line of FIG. 9 changes so as to be narrowed as the rotation speed of motor 20 decreases and so as to be widened as the rotation speed of motor 20 increases.

Similarly, the frequency band of the second sideband wave component higher than or equal to the predetermined level of carrier frequency indicated by the alternate long and short dash line of FIG. 9 also changes so as to be narrowed as the rotation speed of motor 20 decreases and so as to be widened as the rotation speed of motor 20 increases.

The first sideband wave component and the second sideband wave component are thereby prevented from being superimposed on each other in the lower speed range of motor 20, so that uncomfortable beat sound is prevented from occurring.

Figure 10:
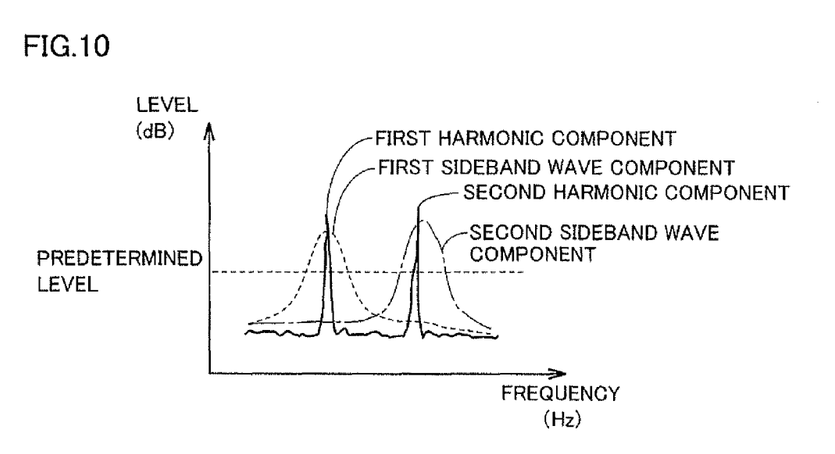
FIG. 10 is a diagram showing distributions of sideband wave components in the case of determining diffusion width depending on motor rotation speed.

FIG. 10 shows frequency distributions of the first sideband wave component and the second sideband wave component in the case where the rotation speed of motor 20 is Nb. The vertical axis of FIG. 10 indicates the noise level, and the horizontal axis of FIG. 10 indicates the frequency. As shown in FIG. 10, in the case of changing the carrier frequency at random within the range of diffusion width determined based on the rotation speed, the width of crest of the first sideband wave component indicated by the broken line of FIG. 10 and the width of crest of the second sideband wave component indicated by the alternate long and short dash line of FIG. 10 are narrower than those of the first sideband wave component and the second sideband wave component shown in FIG. 5, respectively. Superimposition of the first sideband wave component and second sideband wave component which are higher than or equal to the predetermined level is thereby avoided, so that beat sound is prevented from occurring.

As described above, the control device for the rotating electric machine according to the present embodiment allows superimposition of the sideband wave components of carrier frequency to be avoided when the carrier frequency is changed at random, by determining the diffusion width in proportion to the rotation speed of the motor. Beat sound that would result from superimposition of the sideband wave components can thereby be prevented from occurring. Therefore, a control device for a rotating electric machine and a method of controlling the rotating electric machine that avoid superimposition of the sideband wave components of carrier frequency during PWM control of the rotating electric machine to prevent occurrence of noise can be provided.

Moreover, by restricting the diffusion width of carrier frequency more than in the case where the rotation speed of motor 20 is high, it is possible to avoid superimposition of the first sideband wave component and the second sideband wave component that would be likely to occur when the rotation speed of motor 20 is low.

Furthermore, harmonic noise can be uniformized into the broad frequency band by changing the carrier frequency at random within the range of deter wined diffusion width to generate a carrier signal.

Figure 11:
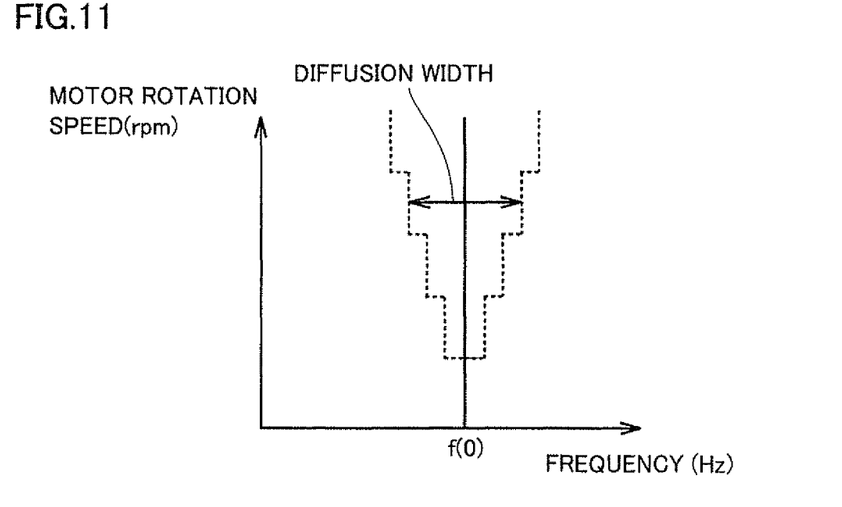
FIG. 11 is a second diagram showing changes in diffusion width of carrier frequency determined depending on motor rotation speed.
Figure 12:
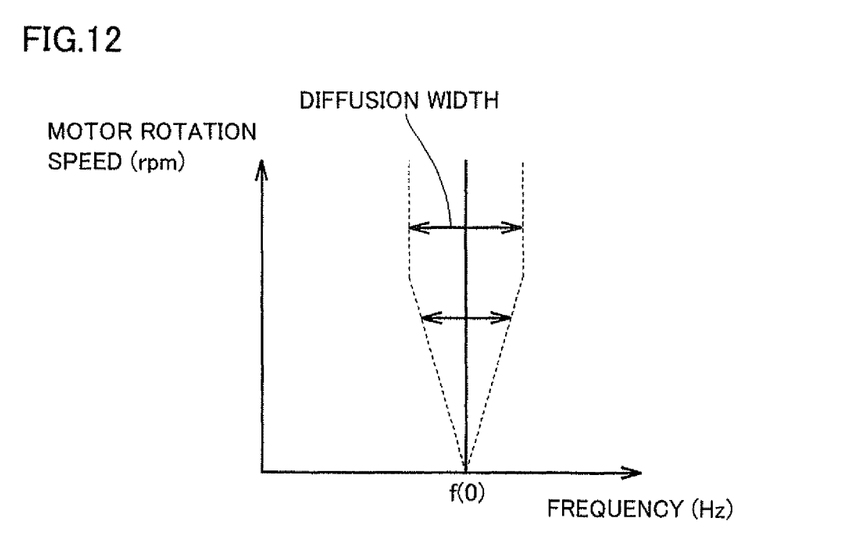
FIG. 12 is a third diagram showing changes in diffusion width of carrier frequency determined depending on motor rotation speed.

It is noted that, although the present embodiment has explained that the diffusion width of carrier frequency shall be determined in proportion to the rotation speed of the motor, it is not limited particularly to proportion as long as superimposition of the first sideband wave component and the second sideband wave component which are higher than or equal to the predetermined level can be avoided. For example, the diffusion width of carrier frequency may be changed stepwise relative to the rotation speed of motor 20 as shown in FIG. 11, or as shown in FIG. 12, when the rotation speed of motor 20 is lower than or equal to a predetermined rotation speed, the diffusion width may be determined in proportion to the rotation speed of the motor and when it is higher than the predetermined rotation speed, the diffusion width may be set at a constant value, or may be changed in accordance with a predetermined nonlinear function relative to the rotation speed of the motor.

Furthermore, although the present embodiment has explained that the carrier frequency shall be changed at random within the range of determined diffusion width to generate a carrier signal, it is not limited particularly to random changes as long as the carrier frequency can be diffused within the range of diffusion width.

For example, the carrier frequency may be changed within the range of determined diffusion width along a sine wave to generate a carrier signal, or the carrier frequency may be changed stepwise within the range of determined diffusion width to generate a carrier signal.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST

1 vehicle, 5 negative electrode bus, 7 positive electrode bus, 10 driving wheel, 15 U-phase vertical arm, 16 V-phase vertical arm, 17 W-phase vertical arm, 20 motor, 30 inverter, 32 switching circuit, 40 boost converter, 50 power storage device, 102 rotation speed detection sensor, 152 diffusion width determination unit, 154 carrier frequency determination unit, 156 PWM carrier generation unit, 158 pulse width modulation unit.

The invention claimed is:

1. A control device for a rotating electric machine having a three-phase coil, comprising:
    a detection unit for detecting a rotation speed of said rotating electric machine;
    a determination unit for determining a diffusion width of a carrier frequency based on the rotation speed of said rotating electric machine detected by said detection unit such that a plurality of sideband wave components occurring centered on the carrier frequency while said rotating electric machine is driven are not superimposed on one another, said determination unit determining said diffusion width such that, when the rotation speed of said rotating electric machine is a first rotation speed, said diffusion width is larger than said diffusion width when the rotation speed is a second rotation speed which is lower than said first rotation speed;
    a carrier generation unit for changing the carrier frequency within a range of said diffusion width determined by said determination unit to generate a carrier signal; and
    a pulse width modulation unit for executing pulse width modulation based on a command voltage and said carrier signal to generate a pulse signal for driving said rotating electric machine.

2. The control device for a rotating electric machine according to claim 1, wherein said determination unit determines said diffusion width such that said diffusion width changes in proportion to the rotation speed of said rotating electric machine between said first rotation speed and said second rotation speed.

3. The control device for a rotating electric machine according to claim 1, wherein
said determination unit determines said diffusion width such that said diffusion width changes stepwise relative to the rotation speed of said rotating electric machine between said first rotation speed and said second rotation speed.

4. The control device for a rotating electric machine according to claim 1, wherein
said carrier generation unit changes the carrier frequency at random within the range of said diffusion width determined by said determination unit to generate said carrier signal.

5. The control device for a rotating electric machine according to claim 1, wherein
said carrier generation unit changes the carrier frequency along a sine wave within the range of said diffusion width determined by said determination unit to generate said carrier signal.

6. The control device for a rotating electric machine according to claim 1, wherein
said carrier generation unit changes the carrier frequency so as to change stepwise within the range of said diffusion width determined by said determination unit to generate said carrier signal.

7. A method of controlling a rotating electric machine having a three-phase coil, comprising the steps of:
detecting a rotation speed of said rotating electric machine;
determining a diffusion width of a carrier frequency based on the rotation speed of said rotating electric machine such that a plurality of sideband wave components occurring centered on the carrier frequency while said rotating electric machine is driven are not superimposed on one another, the determining of the diffusion width being such that, when the rotation speed of said rotating electric machine is a first rotation speed, said diffusion width is larger than said diffusion width when the rotation speed is a second rotation speed which is lower than said first rotation speed;
changing the carrier frequency within a range of said diffusion width to generate a carrier signal; and
executing pulse width modulation based on a command voltage and said carrier signal to generate a pulse signal for driving said rotating electric machine.

* * * * *